United States Patent [19]
Domanski et al.

[11] 3,795,968
[45] Mar. 12, 1974

[54] METHOD OF WELDING STIFFENINGS OF PLATES, PARTICULARLY OF SHELL PLATES AND ARRANGEMENT FOR APPLYING SAID METHOD

[76] Inventors: Bonifacy Domanski, Fitelberga 5/5, Gdansk-Wrzeszcz; Michal Kleminski, Grobla I 8/11, Gdansk; Zdzislaw Zieba, Powstania Wielkopolskiego 68/12, Gdynia, all of Poland

[22] Filed: June 17, 1970
[21] Appl. No.: 47,055

[52] U.S. Cl. .............. 29/457, 29/200 P, 29/462, 228/4, 228/44
[51] Int. Cl. ............................................. B23k 31/00
[58] Field of Search .......... 228/4, 44, 49; 29/200 P, 29/200 J, 428, 457, 462; 219/124, 125, 160

[56] References Cited
UNITED STATES PATENTS

| | | | |
|---|---|---|---|
| 3,159,129 | 12/1964 | Lindmark | 113/131 |
| 2,142,109 | 1/1939 | Burke | 113/112 |
| 3,291,360 | 12/1966 | Linnander | 238/44 |
| 3,561,663 | 2/1971 | Wenzlaff | 228/25 |
| 2,866,889 | 12/1958 | Dempsey | 219/160 |

Primary Examiner—J. Spencer Overholser
Assistant Examiner—Robert J. Craig
Attorney, Agent, or Firm—Irvin A. Lavine

[57] ABSTRACT

Method and apparatus for welding stiffening elements to a plate in which the plate is clamped to a tiltable support table, a stiffening element supported in holders is placed against the plate and clamped to it and to the table by plural clamps, the stiffening element is welded to the plate by welding it progressively from opposite sides, and releasing clamps sequentially as the welding progresses.

9 Claims, 2 Drawing Figures

METHOD OF WELDING STIFFENINGS OF PLATES, PARTICULARLY OF SHELL PLATES AND ARRANGEMENT FOR APPLYING SAID METHOD

The individual elements of a ship's hull plates and deck, composed, in substance, of plate panels, must be stiffened. Generally, as stiffening elements there are used steel sections which are permanently fastened eventually preliminarily or to cut out and eventually preliminarily or shaped plate panels. For that purpose, by means of transportation systems now known, ready-made plate panels were delivered to a welding stand fitted with movable welding heads fastened on a supporting structure specially designed for that purpose. In a corresponding position plate panels were fastened on an immobile base provided with fastening elements. Another delivering system delivered ready-made stiffing elements onto a plate panel resting on a stationary base of the welding stand. The stiffening element, placed on the plate panel was then clamped by means of a number of clamps installed above said element on a foot-operated system specially designed for that purpose; afterwards, the weld joining the stiffening element with the plate panel was made.

A main drawback of said method of joining stiffening elements to plate panels, so far as elements of the hull plating and ship's deck are concerned, is that in order to carry out a double weld the plane of the plate panel and the flange or web of the steel section from which the stiffening element is manufactured must form a right angle. Otherwise, it is necessary to carry out during the welding operation one part of the weld, afterwards, the plate panel with the stiffening element welded-on on one side had to be turned, and after re-placing and fixing the plate panel on the stationary base as well as after clamping the stiffening element to the plate panel and base, the other part of the weld had to be carried out on the other side of the stiffening element. Apart from that, another drawback of the known welding methods, so far as the ship's elements are concerned, is that stiffening elements are clamped only in the direction perpendicular to the plane of the plate panel,.

Said drawbacks are eliminated by the method of welding stiffenings to plates, particularly to hull plates which is the subject of the present invention.

According to said invention method, the plate panels are made ready for welding, and the stiffening elements are delivered on to the welding stand by means of conveyors and stowed on a base shaped so that it forms a tilting table capable of being tilted by means of known hydraulic, pneumatic or electric mechanisms. The tilting table is fitted with a number of fastening elements, e.g., magnets, for fastening the delivered plate panel on its top. Then, by means of a co-acting conveyor, ready-made stiffening elements are delivered on to the welding stand. To save space, it is advantageous that the stiffening elements be delivered in a direction which is in line with the direction of the plate panel delivery and that their positioning, oblique or perpendicular to the direction of movement of the plate panels, should be effected on the welding stand.

The ready-made stiffening element delivered according to said invention method is caught by a number of corresponding movable holders shaped so that irrespective of the cross section of the stiffening element they ensure a strong and temporarily correct catching of said elements. Movable holders are fastened on a supporting bridge structure movable towards the tilting table above the plane of the plate panel. After a number of holders have caught the stiffening element, it is lowered by them until it engages the panel. Then, according to the invention method both the panel thus secured to the tilting base and the stiffening element supported on it and held by means of the holders are additionally clamped to the top of the tilting table by means of clamps. It is advantageous to fasten the clamps to the same bridge structure to which the holders of the stiffening element are fastened. On completion of said operations the welding heads start working, simultaneously carrying out the weld from both sides of the stiffening element, and what is unique, irrespective of the size of the angle created by the plane of the panel with webs or with the base of the stiffening element. During the welding operation - as the weld is carried out - in turn, holders of the stiffening element are released and after welding on the whole element its clamps and/or the clamps of the plate panel are released.

An advantage of the invention method is the possibility of simultaneously carrying out the weld from both sides of the stiffening element irrespective of the shape of the cross section of the stiffening element as well as irrespective of the size of the angle which exists between it and the plate. The size of that angle changes, depending on the requirements, as the table tilts. Simultaneous welding from both sides avoids the necessity for turning of the panel so that welding is effected from only one support. Another advantage of the present method is that the stiffening element is clamped to the plate panel during the welding operation and simultaneously clamped by a number of holders, which prevent its being eventually shifted towards the panel under the influence of a component of an oblique force resulting from the distribution of the clamping force into a force acting along the web of the stiffening element and into a force acting along the inclined plate panel.

Figure 1:
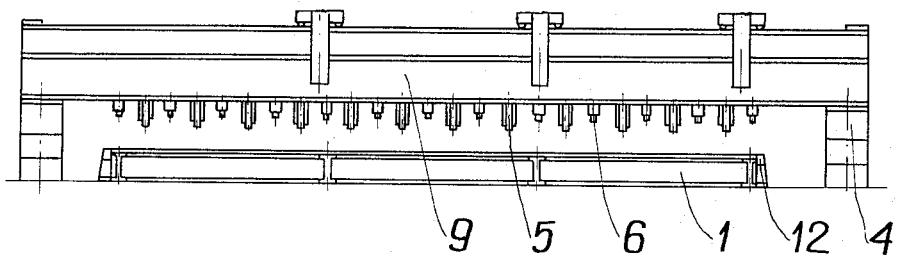
FIG. 1 is an elevational view of an apparatus for welding in accordance with the present invention method, taken on the line A—A of FIG. 2.

Referring now to the drawings, wherein like or corresponding reference numerals are used for like or corresponding parts throughout the several views, there is shown in FIG. 1 a table 1 which is supported for tilting movement in bearings 12. Bearings 12 do not appear in FIG. 2, being concealed by bridge 9, to which reference will be hereinafter made. For tilting the table 1, there is provided a tilting mechanism, generally designated 11; in its preferred form, the tilting mechanism 11 comprises known hydraulic, pneumatic or electric mechanisms which are placed at the four corners of the table 1, and operable in known manner to tilt table 1 while it is supported by the bearings 12.

Adjacent the central portion of the table, there are a plurality of magnets 2, which are used as fastening elements for fastening plate panels to the table 1. The table 1 is also provided with rollers 3 to facilitate the movement of plate panels on the table 1.

Figure 2:
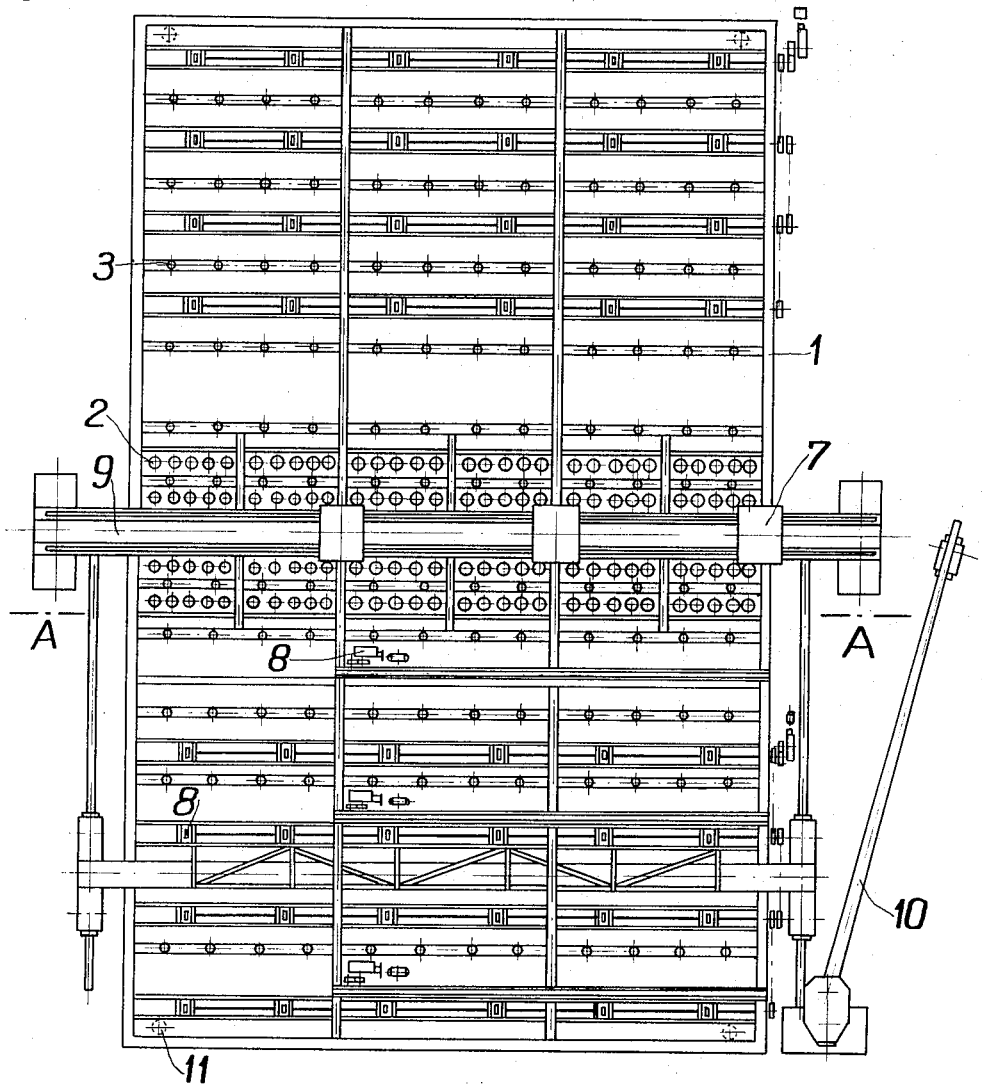
FIG. 2 is a plan view of the apparatus shown in FIG. 1.

In association with the table 1 is a gantry 4, which includes a bridge 9 extending over the table 1 at the central part thereof, as is shown in FIGS. 1 and 2. The bridge 9 carries a plurality of releasable holders 5, and a plurality of releasable clamps 6. The holders 5 are movable, and are shaped so that they are able to securely grasp and hold a number of different shapes of commonly used stiffening elements, which stiffening elements may be bars, T-bars and L-bars. The clamps 6 are used to clamp both the plate and the stiffening element to the table 1.

Also carried by the bridge 9 of the gantry 4 are welding heads 7, which are movable along the bridge 9, each welding head 7 being provided with two welding units so that welding action can be carried out simultaneously from both sides, while the welding head 7 moves, thereby effecting progressive welding from two sides. Preferably, as the welding heads 7 move along the bridge 5, progressively effecting the weld from both sides simultaneously, the holders 5 and clamps 6 are serially released.

To support and facilitate the welding operation, the table 1 is provided with conveyors 8 which function to move plate panels so that proper portions of the panels are positioned beneath the bridge 9 of gantry 4 for attachment of stiffening elements thereto by the above noted welding operations. In addition, a crane 10 is provided adjacent the table 1 in order to enable movement of the plate panels to or from the table 1.

What we claim is

1. A method of welding stiffening elements at an inclined angle to plates comprising:
    releasably fastening a plate panel to a tiltable supporting table,
    tilting said table and the plate panel releasably fastened thereto,
    clamping a stiffening element against said plate panel in an inclined position relative to said plate panel, and welding said stiffening element to said plate panel from both sides of said element simultaneously and progressively along the joint between said clamped elements and said panel.

2. The method of claim 1, wherein said stiffening element is held in a plurality of releasable holding elements, and said holding elements are serially released as said welding is effected.

3. The method of claim 1, said clamping being effected by a plurality of releasable clamping elements, and said clamping elements being serially released as said welding is effected.

4. Apparatus for supporting and welding plates and stiffening elements comprising:
    a table,
    bearing means for supporting a portion of said table,
    means for tilting said table on said bearing means,
    supporting means extending over said table,
    a plurality of means for releasably holding stiffening elements carried by said supporting means,
    plural welding means, and means for supporting said welding means on said supporting means for simultaneously welding on opposite sides of a stiffening element carried by said holding means.

5. The apparatus of claim 4, said supporting means comprising a gantry having a bridge extending over said table.

6. The apparatus of claim 4, and further comprising clamping means on said supporting means for clamping a said stiffening element and plate against said table.

7. The apparatus of claim 4, and fastening means on said table for fastening a plate thereto.

8. The apparatus of claim 7, said fastening means comprising a plurality of magnetic means.

9. The apparatus of claim 4, said table having conveyor means associated therewith.

* * * * *